United States Patent [19]

Bauer

[11] Patent Number: 5,152,631
[45] Date of Patent: Oct. 6, 1992

[54] POSITIVE-ENGAGING COUPLING FOR A PORTABLE HANDHELD TOOL

[75] Inventor: Peter Bauer, Winnenden, Fed. Rep. of Germany

[73] Assignee: Andreas Stihl, Waiblingen, Fed. Rep. of Germany

[21] Appl. No.: 796,650

[22] Filed: Nov. 22, 1991

[30] Foreign Application Priority Data

Nov. 29, 1990 [DE] Fed. Rep. of Germany ... 9016232[U]

[51] Int. Cl.⁵ .............................................. B25G 3/10
[52] U.S. Cl. .................................... 403/372; 403/383
[58] Field of Search .................. 403/372, 383; 464/89

[56] References Cited

U.S. PATENT DOCUMENTS

| | | | |
|---|---|---|---|
| 2,558,589 | 6/1951 | Skolfield | 464/89 |
| 3,808,838 | 5/1974 | Bowen et al. | 464/89 |
| 4,385,897 | 5/1983 | Mallet | 464/89 |
| 4,530,674 | 7/1985 | Rauch | 464/89 X |

FOREIGN PATENT DOCUMENTS 1010911  6/1952  France .................................. 464/89

Primary Examiner—Andrew V. Kundrat
Attorney, Agent, or Firm—Walter Ottesen

[57] ABSTRACT

The invention is directed to a positive-engaging coupling between a drive part and a driven part. The positive-engaging coupling includes an insert portion defining a first noncircular cross section and formed on the driven part. The drive part defines a receptacle for accommodating the insert portion therein and the receptacle has a second noncircular cross section corresponding to the first noncircular cross section. The insert portion and the receptacle conjointly define an intermediate space when the insert portion is inserted into the receptacle. An elastic insert is inserted into the receptacle for filling out the intermediate space when the insert portion of the driven part is disposed in the receptacle. If an overload occurs, the elastic insert is destroyed and the insert portion rotates freely within the receptacle.

9 Claims, 2 Drawing Sheets

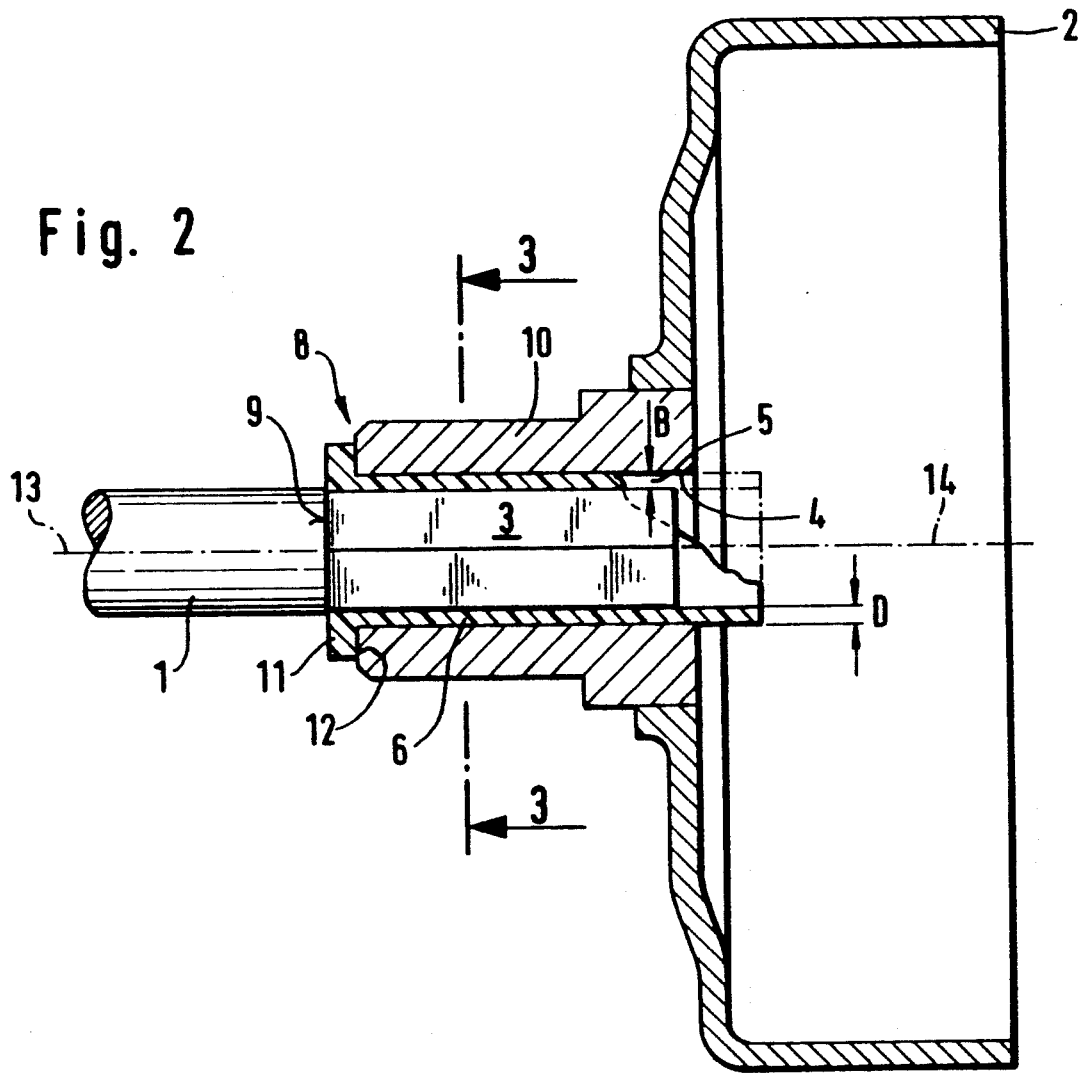

POSITIVE-ENGAGING COUPLING FOR A PORTABLE HANDHELD TOOL

Field of the Invention

The invention relates to a positive-engaging coupling for a portable handheld tool. The positive-engaging coupling is between a drive part and a driven part. The drive part can be especially a rotating component such as a clutch drum, toothed wheel, belt pulley or the like while the driven part includes especially a shaft. The driven part has an insert portion having a cross section departing from a circular form and the drive part has a receptacle having a cross section corresponding to the cross section of the insert portion.

BACKGROUND OF THE INVENTION

A positive-engaging coupling of the kind described above is provided between a drive part and a driven part in portable handheld tools such as motor-driven chain saws, brushcutters, cutoff machines or the like. The connection between the drive part and the driven part is such that the driven part is fixed to rotate with the drive part. Thus, in a brushcutter, for example, the clutch drum of a clutch driven by a motor is connected to the driven shaft via a positive-engaging coupling with the drive shaft, in turn, driving a cutterhead. This type of known insert connection is especially problematical with respect to brushcutters. An axial offset between the journalled clutch drum and the driven shaft journalled in a protective tube can occur because of an elastic damping element arranged on the drive motor which is mostly an internal combustion engine. This offset can cause considerable problems to occur after the positive-engaging insertion of the driven shaft into the clutch drum especially because of the high rotational speeds of approximately 7,000 rpm. Radial play occurs in the insert connection and leads to deterioration of this connection with the radial play being caused, for example, by alternating loads which are imparted to the cutting tools of the cutterhead. For this reason, the positive-engaging coupling or the components defining the same must be exchanged after a relatively short duration of operation. An exchange of this kind of components causes the tool not only to be taken out of service for a longer period of time but also consumes time and material and is therefore costly. The product image also suffers when, after a relatively short operating time, always the same parts must be renewed.

SUMMARY OF THE INVENTION

It is an object of the invention to provide a positive-engaging coupling for portable handheld tools such as brushcutters. It is another object of the invention to provide a positive-engaging coupling which is simple to manufacture and which ensures that the positive-engaging parts can be joined along a common axis while compensating for a possible axial offset which may occur. It is still another object of the invention to provide such a positive-engaging coupling which provides a long service life.

The invention is directed to a positive-engaging coupling between a drive part and a driven part. The positive-engaging coupling includes: the driven part having an insert portion defining a first noncircular cross section; the drive part defining a receptacle for accommodating the insert portion therein and the receptacle having a second noncircular cross section corresponding to the first noncircular cross section; the first noncircular cross section having dimensions less than the second noncircular cross section whereby the insert portion and the receptacle conjointly define and intermediate space when the insert portion is inserted into the receptacle; and, an elastic insert inserted into the receptacle for filling out the intermediate space when the insert portion is disposed in the receptacle.

Large tolerances can be permitted between the insert portion of the shaft and the receptacle so that the positive-engaging coupling can be manufactured by simple, cost-saving work steps. The intermediate space is produced by tolerances and is disposed between the insert portion and the receptacle. This intermediate space is compensated by an elastic insert whereby a positive-engagement rotation connection is guaranteed between the drive part and the driven part. An axial offset between the clutch drum and the driven shaft can be compensated for by the elastic insert without causing the bearing of the clutch drum or the driven shaft to be subjected to an increased loading. This is of considerable significance especially because of the high operating rotational speeds of approximately 7,000 rpm. It has been shown that the service life of the connection has been increased by a multiple by the arrangement of the elastic insert and the elastic behavior of the positive-engaging coupling of the invention obtained in this manner.

The insert advantageously has a uniform wall thickness which corresponds approximately to the width of the intermediate space so that a simple assembly is possible. It can however be advantageous to form the wall thickness of the insert to be slightly greater than the width of the intermediate space in order to obtain a press fit.

The elastic insert can, for example, be made from a tube piece. It is advantageous to provide the insert with a cross section adapted to the cross section of the receptacle or the cross section of the insert portion.

According to another preferred embodiment of the invention, the insert is made of an elastic plastic such as polyurethane.

BRIEF DESCRIPTION OF THE DRAWINGS

The invention will now be described with reference to the drawings wherein:

FIG. 2 is an axial section view taken through the positive-engaging coupling of FIG. 1; and, FIG. 3 is a section view taken along line 3—3 of FIG. 2.

DESCRIPTION OF THE PREFERRED EMBODIMENTS OF THE INVENTION

Figure 1:
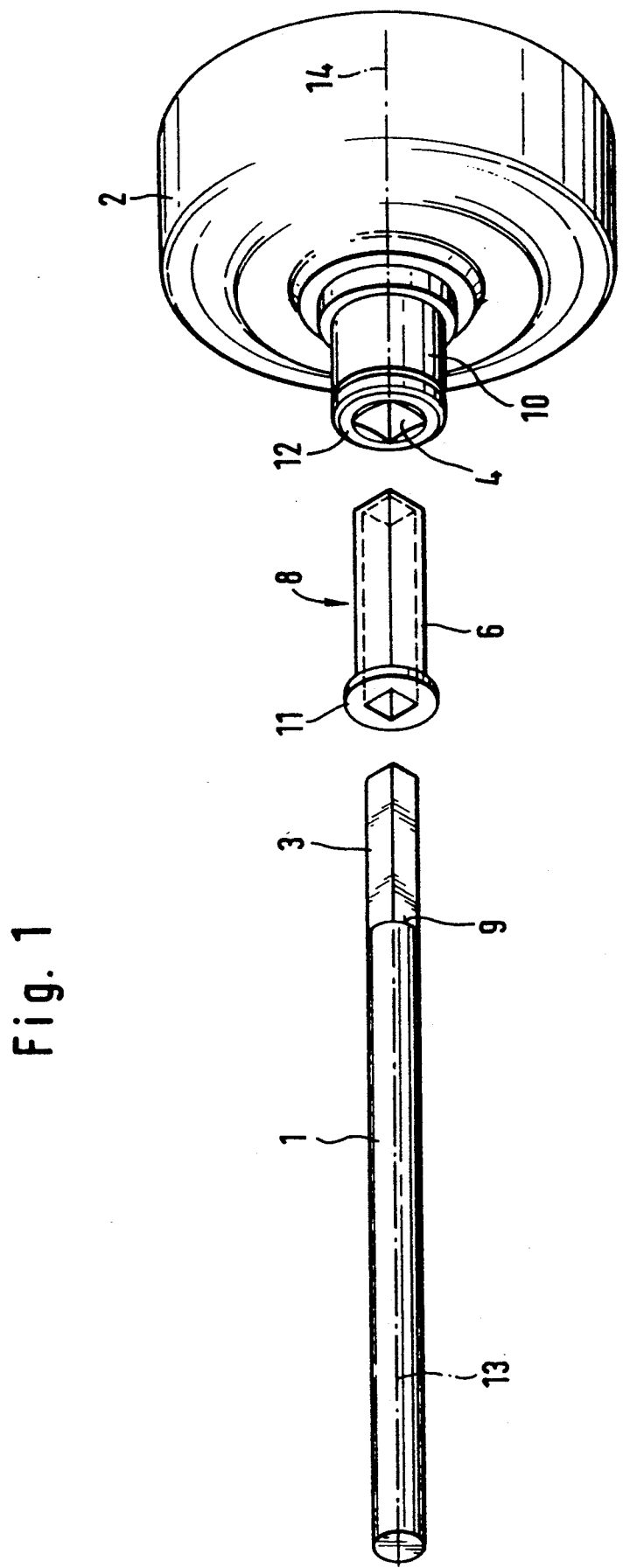
FIG. 1 is a perspective view of the positive-engaging coupling according to the invention.

FIG. 1 shows a shaft 1 as a driven part having a first end which is configured as an insert portion 3. The insert portion 3 has a cross section departing from the circular form as shown in FIG. 3. The cross section is advantageously a square with the cross section having such dimensions that the diagonal of the cross section corresponds approximately to the diameter of the shaft 1. The shaft 1 defines a shoulder 9 at its transition to the insert portion 3.

A receptacle 4 is assigned to the insert portion 3 and is axially provided in a shaft stub 10 of a clutch drum 2 defining the drive part. As shown in FIG. 2, the receptacle 4 is configured as a receptacle which extends through the shaft stub 10. The axis of the clutch drum 2 and the longitudinal axis of the receptacle 4 preferably lie so that they are coincident; however, a slight axial offset can be present caused by the construction of the respective parts.

The clutch drum 2 is part of a clutch (not shown) which is driven by a motor especially an internal combustion engine. The shaft 1 defines the part driven by the clutch and connects a rotating cutterhead to the clutch drum. The cutterhead is attached to the end of the protective tube in which the driven shaft is rotatably journalled. A portable handheld tool of this kind is known as a brushcutter.

The receptacle 4 provided in the clutch drum 2 has a cross section adapted to the insert portion 3 with the cross section of the insert portion 3 having smaller dimensions than the cross section of the receptacle 4. In this way, an intermediate space 5 is formed between the insert portion 3 and the wall of the receptacle 4. The intermediate space 5 is shown in FIGS. 2 and is filled out by an elastic insert 6. The insert 6 preferably is made of plastic, especially polyurethane. The insert 6 has a wall thickness D which corresponds to the width B of the intermediate space 5 (FIG. 2). It can be advantageous to make the wall thickness D slightly greater than the width B.

In the embodiment shown, the plastic insert 6 has a cross section adapted to the cross section of the receptacle 4 or the cross section of the insert portion 3 as shown especially in FIG. 3. The end of the plastic insert 6 facing toward the shaft 1 has a flange 11 projecting radially outwardly. The flange 11 is configured as an annular flange.

For assembling the positive-engaging coupling 8, the plastic insert 6 is either pushed onto the insert portion 3 or inserted into the receptacle 4. Then, the insert portion is pushed axially into the receptacle 4 until the annular flange 11 lies clamped between the shoulder 9 of the shaft 1 and the end face 12 of the shaft stub 10 facing toward the shaft 1. In this position shown in FIG. 2, it is ensured that the axis 13 of the shaft 1 is coincident with the axis 14 of the clutch drum 2 so that it is guaranteed, because of the arrangement of the plastic insert 6, that the positions of the shaft 1 and clutch drum 2 will be axially coincident notwithstanding the play between the insert portion 3 and the receptacle 4 and notwithstanding a possible axial offset.

As can be especially seen in FIG. 2, the plastic insert 6 is configured to be longer than the receptacle 4 and advantageously also longer than the insert portion 3. In the embodiment shown, the insert portion 3 is approximately as long as the receptacle 4 with the insert portion 3 lying within the receptacle 4 in the assembled condition because of the annular flange 11 between the shaft stub 10 and the shaft 1.

It is understood that the foregoing description is that of the preferred embodiments of the invention an that various changes and modifications may be made thereto without departing from the spirit and scope of the invention as defined in the appended claims.

What is claimed is:

1. A positive-engaging coupling between a drive part and a driven part, the positive-engaging coupling comprising:

said driven part having an insert portion defining a first noncircular cross section;

said drive part defining a receptacle for accommodating said insert portion therein and said receptacle having a second noncircular cross section corresponding to said first noncircular cross section and being selected to ensure a positive-engaging coupling between said parts which permits said drive part to drive said driven part;

said first noncircular cross section having dimensions less than said second noncircular cross section so as to cause said insert portion and said receptacle to conjointly define an intermediate space when said insert portion is inserted into said receptacle with said space being sufficiently narrow to retain said positive-engaging coupling between said parts;

an elastic insert inserted into said receptacle for filling out said intermediate space when said insert portion is disposed in said receptacle;

said intermediate space having a width B;

said insert being an annular member having a uniform wall thickness D corresponding approximately to said width B of said intermediate space;

said insert having a cross section corresponding to at least one of said first noncircular cross section and said second noncircular cross section;

said insert having an annular flange formed thereon;

said driven part being a shaft having said insert portion formed on one end thereof;

said shaft having a shoulder formed thereon between said insert portion and the remainder of said shaft; and, said receptacle having an end face adjacent said shoulder and said annular flange being clamped between said shoulder and said end face.

2. The positive-engaging coupling of claim 1, wherein said first noncircular cross section is a polygon.

3. The positive-engaging coupling of claim 2, wherein said polygon is a square.

4. The positive-engaging coupling of claim 1, wherein said insert is made of plastic.

5. The positive-engaging coupling of claim 4, wherein said plastic is polyurethane.

6. The positive-engaging coupling of claim 1, wherein said insert is configured to be longer than said receptacle.

7. The positive-engaging coupling of claim 1, wherein said insert is configured to be longer than said insert portion.

8. The positive-engaging coupling of claim 1, wherein said drive part is a clutch drum.

9. A positive-engaging coupling between a drive part and a driven part, the positive-engaging coupling comprising:

one of said parts having an insert portion defining a first noncircular cross section;

the other one of said parts defining a receptacle for accommodating said insert portion therein and said receptacle having a second noncircular cross section corresponding to said first noncircular cross section and being selected to ensure a positive-engaging coupling between said parts which permits one of said parts to drive the other one of said parts;

said first noncircular cross section having dimensions less than said second noncircular cross section so as to cause said insert portion and said receptacle to conjointly define an intermediate space when said insert portion is inserted into said receptacle with said space being sufficiently narrow to retain and said positive-engaging coupling between said parts;

an elastic insert inserted into said receptacle for filling out said intermediate space when said insert portion is disposed in said receptacle;

said intermediate space having a width B;

said insert being an annular member having a uniform wall thickness D corresponding approximately to said width B of said intermediate space;

said insert having a cross section corresponding to at least one of said first noncircular cross section and said second noncircular cross section;

said insert having an annular flange formed thereon;

said one part being a shaft having said insert portion formed on one end thereof;

said shaft having a shoulder formed thereon between said insert portion and the remainder of said shaft; and, said receptacle having an end face adjacent said shoulder and said annular flange being clamped between said shoulder and said end face.

* * * * *